United States Patent
Chu et al.

(10) Patent No.: US 6,891,591 B2
(45) Date of Patent: May 10, 2005

(54) SLANT REFLECTOR WITH BUMP STRUCTURE AND METHOD OF FABRICATING THE SAME

(75) Inventors: Cheng-Jen Chu, Ilan (TW); Chin-Cheng Chien, Tainan (TW)

(73) Assignee: Chi Mei Optoelectronics Corp. (TW)

( * ) Notice: Subject to any disclaimer, the term of this patent is extended or adjusted under 35 U.S.C. 154(b) by 0 days.

(21) Appl. No.: 10/271,747

(22) Filed: Oct. 17, 2002

(65) Prior Publication Data

US 2003/0086035 A1 May 8, 2003

(30) Foreign Application Priority Data

Oct. 22, 2001 (TW) .......................................... 90126085 A

(51) Int. Cl.[7] .................................................. G02F 1/13
(52) U.S. Cl. ........................ 349/187; 349/113; 438/30
(58) Field of Search ................................ 349/113, 187; 438/30; 359/263, 622

(56) References Cited

U.S. PATENT DOCUMENTS

| | | |
|---|---|---|
| 5,408,345 A | 4/1995 | Mitsui et al. |
| 5,610,741 A | 3/1997 | Kimura |
| 5,691,791 A * | 11/1997 | Nakamura et al. .......... 349/113 |
| 6,291,146 B1 * | 9/2001 | Chang et al. ................ 430/394 |
| 6,452,653 B1 * | 9/2002 | Yamanaka et al. .......... 349/113 |

FOREIGN PATENT DOCUMENTS

JP          10010525          1/1998

OTHER PUBLICATIONS

High Brightness Reflective TFE–LCD, Dec. 1999 and English–language Abstract.

* cited by examiner

*Primary Examiner*—Tarifur R. Chowdhury
*Assistant Examiner*—Prasad Akkapeddi
(74) *Attorney, Agent, or Firm*—Rabin & Berdo P.C.

(57) ABSTRACT

A method of fabricating slant reflector with bump structure, at least comprising the steps of: providing a substrate; forming a photosensitivity material layer on the substrate; patterning the photosensitivity material layer to form m groups of pattern (m≧1, m is positive integral), and each group of pattern includes a plurality of bumps with different bottom area; and jointing the bumps to form a slant surface with bump structure. The photosensitivity material layer is either orderly or randomly patterned to form m groups of patterns. The step of patterning the photosensitivity material layer includes exposing and developing. The invention utilizes one photo-mask with particular pattern to fabricate the bump structure in a simple way.

17 Claims, 8 Drawing Sheets

SLANT REFLECTOR WITH BUMP STRUCTURE AND METHOD OF FABRICATING THE SAME

This application incorporates by reference of Taiwan application Serial No. 090126085, filed Oct. 22, 2001.

BACKGROUND OF THE INVENTION

1. Field of the Invention

The invention relates in general to a slant reflector with a bump structure and a fabricating method thereof, and more particularly to the slant reflector with bump structure fabricated by one photo-mask and applied in the reflective type liquid crystal display (LCD).

2. Description of the Related Art

In recent years, it is not only the brightness but also the viewing angle required for the reflective type liquid crystal display (LCD) that has become important in the commercial market. It is a very important issue for the manufacturers and researchers to develop a reflective type LCD with a high brightness and a wide viewing angle.

FIG. 1A is a light path of a horizontal reflector with a smooth surface. The dash line represents a normal (perpendicular) to the surface of the reflector 100. The reflector 100 is set up horizontally, and the surface thereof is smooth. It is assumed that an angle of incidence of the incident light arriving at the surface of reflector is 20 degree. According to the optical theory, the angle of reflectance of the reflected light is −20 degree. Hence, the maximum reflectance $R_1$ occurs at the viewing angle of −20 degree, and the curve of reflectance distribution is very narrow, mostly in the region around −20 degree. FIG. 1B represents the reflectance distribution of the conventional reflector of FIG. 1A. The reflectance is measured by an optical detection system.

However, the ideal LCD represents the maximum reflectance at the viewing angle of 0 degree, and distributes parts of reflectance at more wide range of the viewing angle. To shift the curve of FIG. 1 towards the left, it is another conventional method which slants the reflector to change the light path. FIG. 2A is a light path of a slant reflector with a smooth surface. The dash line represents a normal (perpendicular) to the upper surface 200' of the reflector 200. The reflector 200 is set up with an inclined angle (10 degree), and the upper surface 200' thereof is smooth. Since the angle between the upper surface 200' and the horizontal plane is 10 degree, the original incident light at 20 degree of incidence can be reflected at the angle of 0 degree, as demonstrated in FIG. 2A. FIG. 2B represents the reflectance distribution of the conventional reflector of FIG. 2A. The maximum reflectance $R_1$ occurs at the viewing angle of 0 degree, but the curve of reflectance distribution is still narrow. The results of reflectance mostly occur in the region around 0 degree. The objective of the ideal reflective type LCD with wide viewing angle has not been achieved.

Another conventional method is further provided to form numerous bumps on the slant reflector. FIG. 2C is a light path of another slant reflector with a smooth surface. FIG. 2C provides a curving surface having an angle of 10 degree such that numerous normals perpendicular to the curving surface of the reflector 300 are generated. Accordingly, the angles of reflection generated by the reflector 300 of FIG. 2C are more than the reflector 200 of FIG. 2A. However, the curve of reflectance distribution is still narrow, and the reflectance mostly occurs in the region around 0 degree. The reflectance distribution of the reflector 300 of FIG. 2C is similar to FIG. 2B.

FIG. 3 represents the ideal reflectance distribution of the reflector. The reflector is set up with an inclined angle (10 degree), and there are numerous bumps formed on the slant surface of the reflector. The high reflectance is detected around the angle of 0 degree due to the slanted reflector. Also, part of reflectance is detected over a wide range of viewing angles since the normals on each point of the bump are not parallel. Comparing the results of FIG. 2B and FIG. 3, the maximum reflectance $R_2$ of FIG. 3 is lower than the maximum reflectance $R_1$ of FIG. 2, but the reflectance distribution of FIG. 3 is wider than that of FIG. 2. Therefore, the LCD adopting the slant reflector with bump structure possesses two attractive features—high brightness and wide viewing angle.

FIG. 4A~FIG. 4F show a conventional method of fabricating a slant reflector with a bump structure. In this conventional process, a photo-mask 406 with a single slit is provided, and multi-step exposure is performed. First, the photosensitivity material such as photo-resist 404 is deposited on the substrate 402. Then, the photo-mask 406 with the single slit is utilized for the pattern transfer. It is assumed that the photo-resist 404 is a positive photo-resist dissolving in the developer. In FIG. 4A, the photo-resist 404 is exposed to the UV (Ultraviolet) light at an intensity of $L_1$ for a time $t_1$, and an exposed area A is formed. Second, the photo-mask 406 is shifted to the right, and the photo-resist 404 is exposed to the UV (Ultraviolet) light at an intensity of $L_2$ for a time $t_2$ to form an exposed area B, as shown in FIG. 4B. Next, the photo-mask 406 is shifted to the right again, and the photo-resist 404 is exposed to the UV (Ultraviolet) light at an intensity of $L_3$ for a time $t_3$ to form an exposed area C, as shown in FIG. 4C. Either by setting equal exposing times and the light intensity at $L_1 > L_2 > L_3$, or by setting equal intensities and the exposing time at $t_1 > t_2 > t_3$, the sizes of the exposing areas are consequently controlled at the order of A>B>C.

Subsequently, the development is performed on the photo-resist 404 to form a ladder-like appearance, as shown in FIG. 4D. Then, the ladder-like photo-resist 404' is melted by heat treatment. When the heating temperature is increased up to the glass transition temperature of photo-resist 404, the photo-resist 404' will be softened as the melting glass and reflowed to form a slant photo-resist 404" with a smooth surface, as shown in FIG. 4E. Next, a second photo-mask (not shown) is provided to form a plurality of bumps 408 on the slant photo-resist 404", as shown in FIG. 4F. Finally, a metal film (not shown) is deposited on the slant photo-resist 404", and also covering the bumps 408.

The ideal reflectance distribution (FIG. 3) can be achieved by the slant reflector with a bump structure, fabricated by the conventional process (FIG. 4A~FIG. 4F). However, this conventional process has several drawbacks. For example: the photo-mask needs to be shifted over and over again, and the position of the photo-mask, UV light intensity or duration time needs to be adjusted while the photo-mask is shifted. It is time-consuming, and the production cost is consequently raised. It is required to shift the photo-mask and expose the photo-resist at least for three times, in order to form a slant photo-resist (404"). If numerous slant photo-resists are required to create the tilt surface of the reflector for enhancing the light scattering effect, the conventional process for fabricating thereof is time-consuming and not suitable for the mass-production scale. Also, the conventional process requires at least two photo-masks. One is used for fabricating the slant surface, and the other for forming a plurality of bumps on the slant surface. It is very inconvenient.

SUMMARY OF THE INVENTION

It is therefore an object of the invention to provide a slant reflector with bump structure and a method of fabricating the same thereof, so that the fabrication is simplified and the light scattering effect is improved. Also, the reflective type LCD adopting the slant reflector with bump structure of the invention provides the performance of high brightness and wide viewing angle.

According to the objective of the invention, a method of fabricating slant reflector with bump structure is provided, and at least comprising the steps of: providing a substrate; forming a photosensitivity material layer on the substrate; patterning the photosensitivity material layer to form m groups of pattern (m≧1, m is positive integral), and each group of pattern includes a plurality of bumps with different bottom area; and jointing the bumps to form a slant surface with bump structure. The photosensitivity material layer can be orderly or randomly patterned to form m groups of patterns. The step of patterning the photosensitivity material layer includes exposing and developing. Also, the bumps melt by baking for jointing the bumps.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1B:
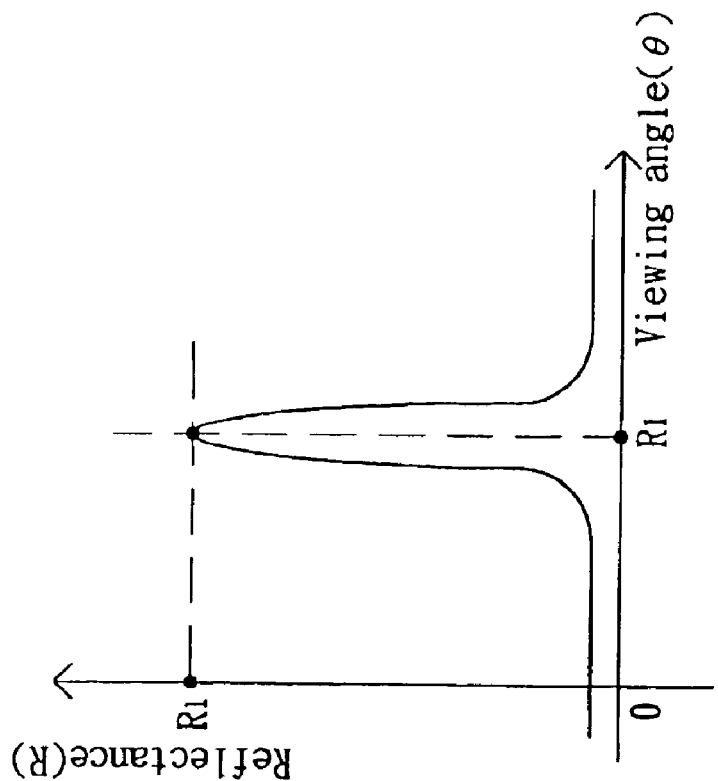
FIG. 1B represents the reflectance distribution of the conventional reflector of FIG. 1A.
Figure 1A:
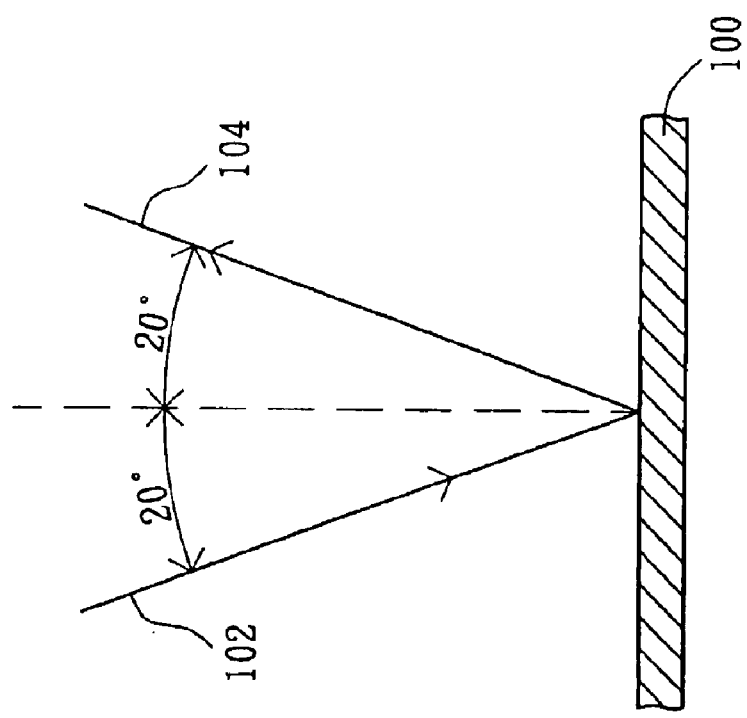
FIG. 1A is a light path of a horizontal reflector with smooth surface.
Figure 2B:
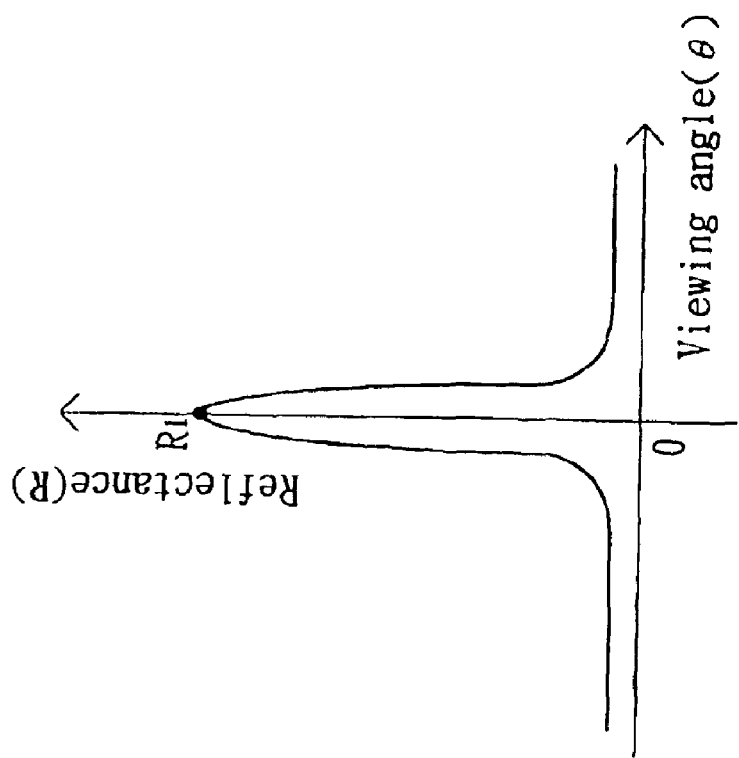
FIG. 2B represents the reflectance distribution of the conventional reflector of FIG. 2A.
Figure 2A:
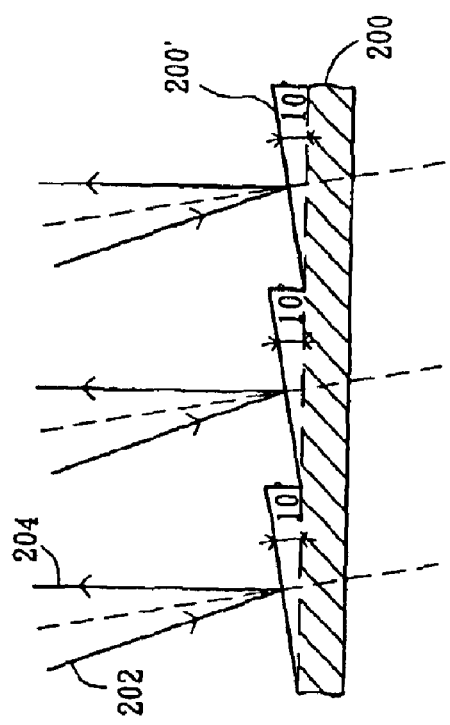
FIG. 2A is a light path of a slant reflector with smooth surface.
Figure 3:
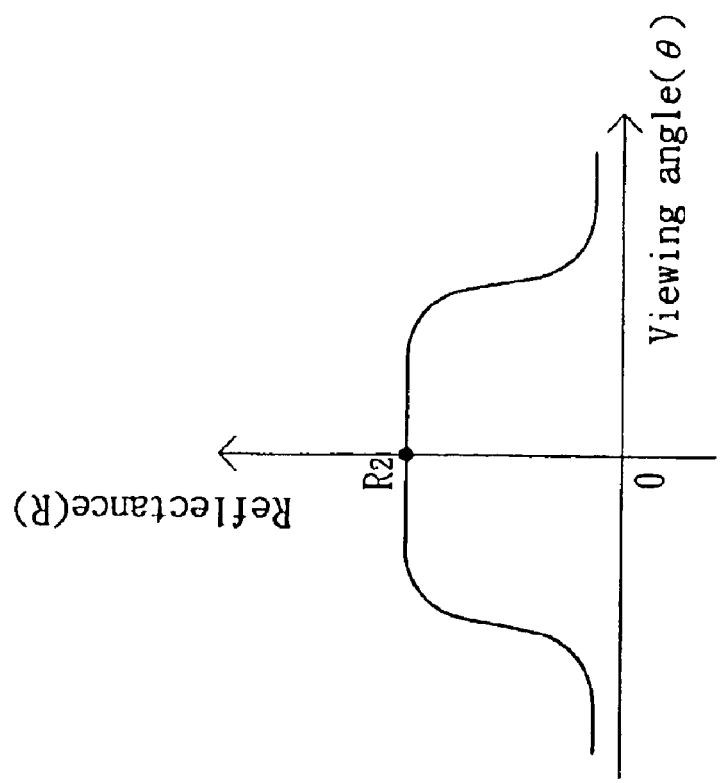
FIG. 3 represents the ideal reflectance distribution of the reflector.
Figure 2C:
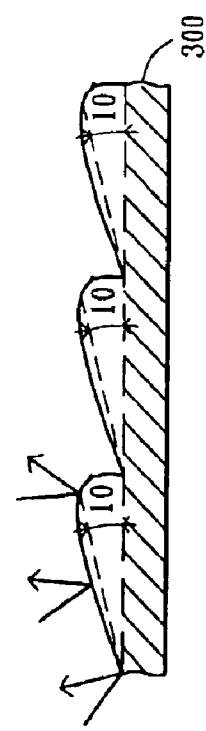
FIG. 2C is a light path of another slant reflector with smooth surface.
Figure 4A:
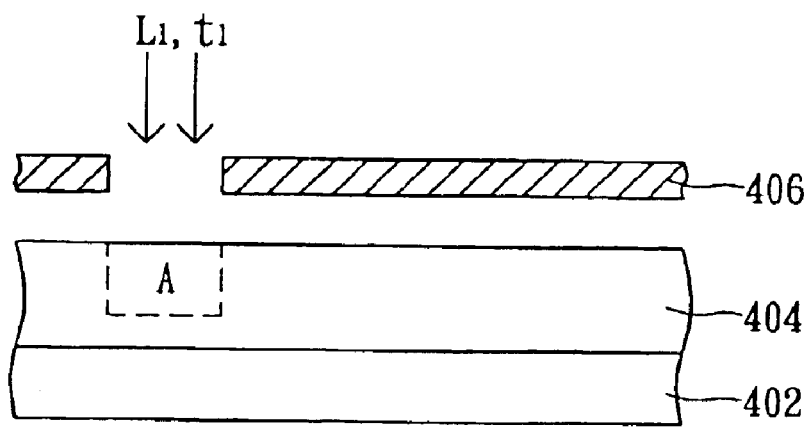
FIG. 4A~FIG. 4F is a conventional method of fabricating slant reflector with bump structure.
Figure 4B:
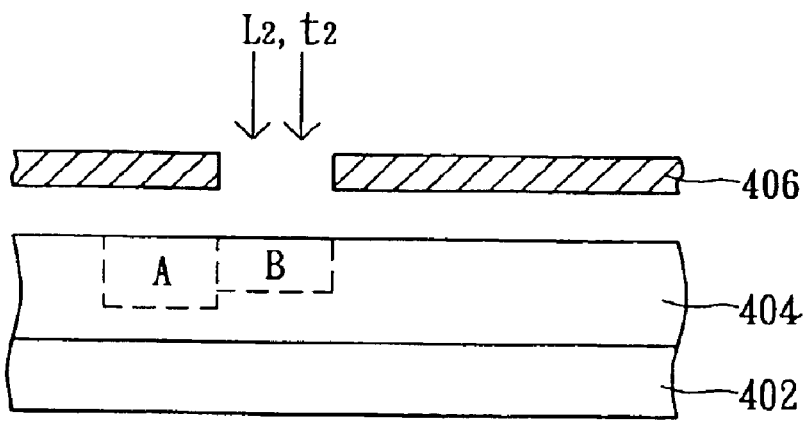
Figure 4C:
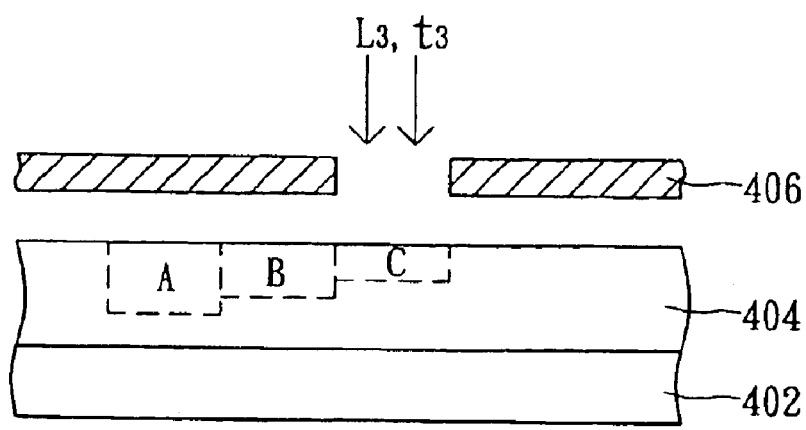
Figure 4D:
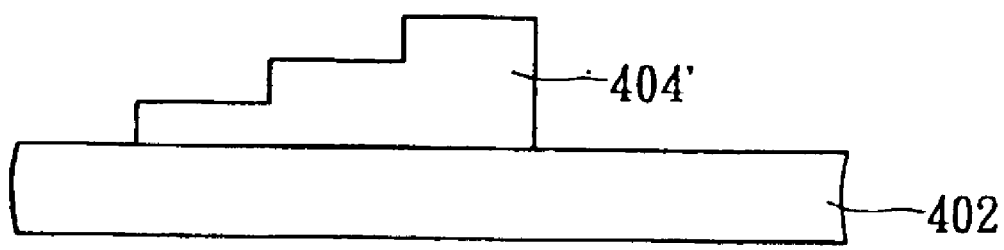
Figure 4E:
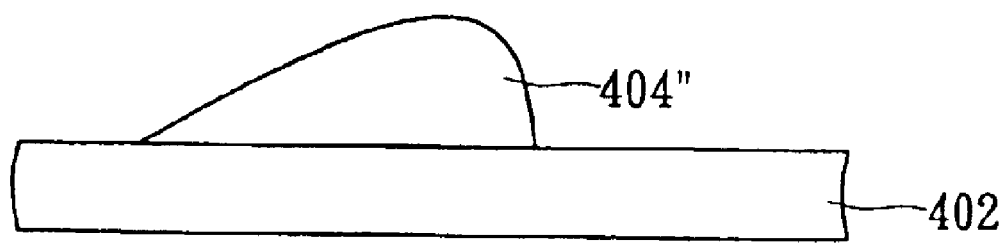
Figure 4F:
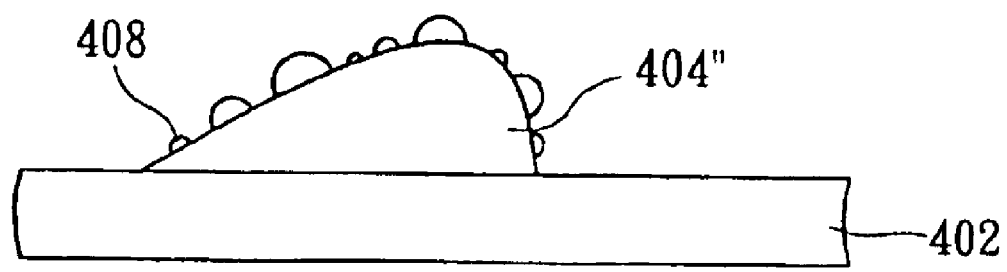

In the present invention, one photo-mask with a particular pattern is provided for exposing and developing the photosensitive material (such as photoresist) by optical diffraction. Thus, a number of bumps having different bottom areas are formed on the photosensitive material. Then, the bumps are jointed by a melting process, such as baking the bumps followed by reflowing in order to form a bump-on-slant structure, in which the contiguous bumps having a smooth surface are arranged from large to small, and high to low.

The slant reflector with a bump structure of the invention can be applied in the reflective type liquid crystal display (LCD). The bump-on-slant structure with an inclined angle can be further covered by a metal film for reflecting the light. Since the metal film has the same profile as the bump structure underneath, the light entering the reflective type LCD can be reflected in various angles by the metal film. Therefore, the attractive features such as high brightness and wide viewing angle of the reflective type LCD can be achieved.

The slant reflector with a bump structure and the method of fabricating the same according to the invention are described below. It will be appreciated that the drawings and illustration of the embodiments may slightly vary without departing from the main concepts as disclosed herein. Also, to avoid obscuring the invention, well-known elements not directly relevant to the invention are neither shown nor described. Accordingly, the specification and the drawing are to be regard in an illustrative sense rather than in a restrictive sense.

First Embodiment

In the first embodiment, a photo-mask with a particular pattern is provided for the purpose of forming the slant reflector with a bump structure of the invention. The photo-mask has numerous bars having different widths.

Figure 5:
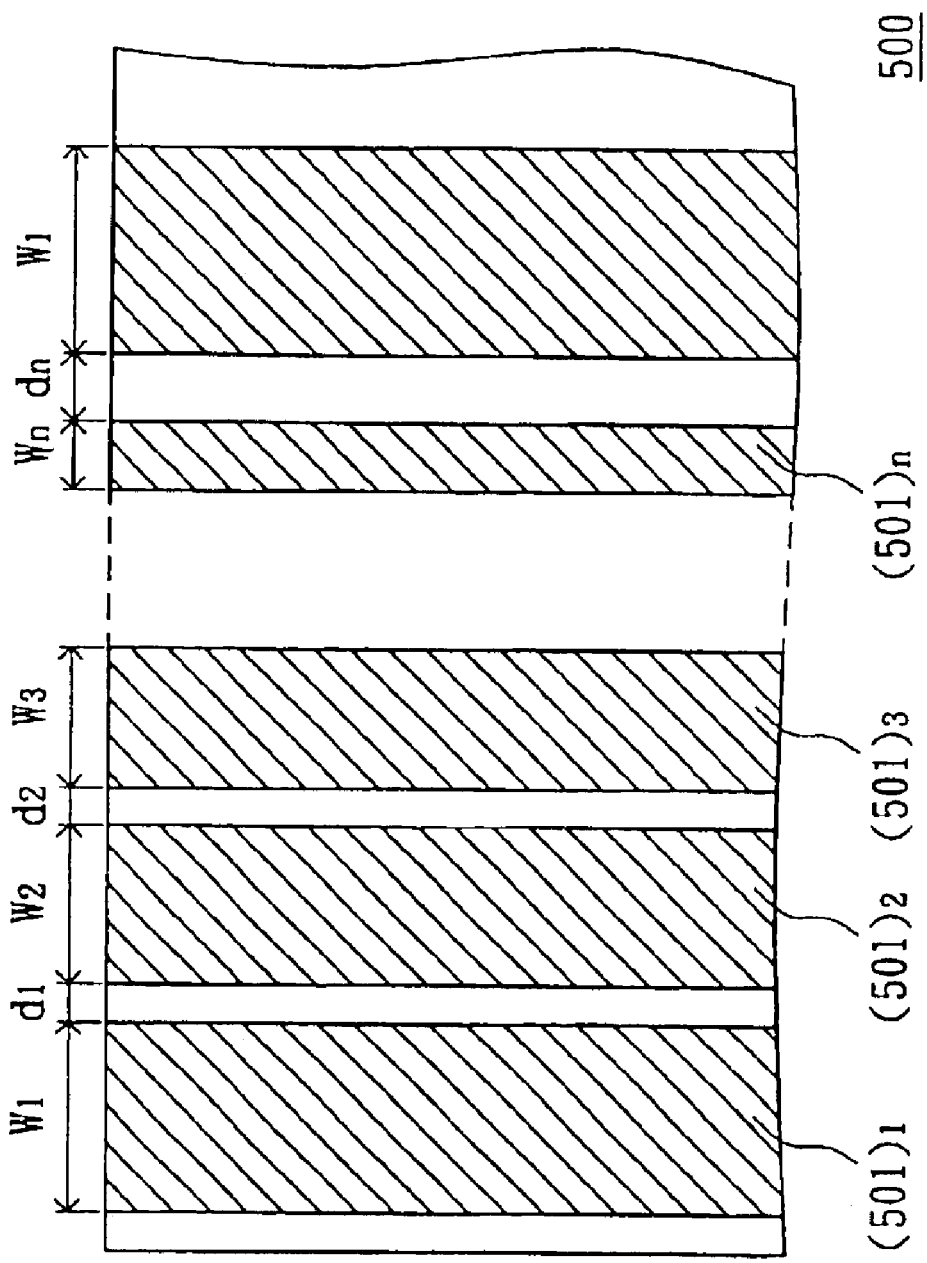
FIG. 5 is a partial top view of a photo-mask according to the first embodiment of the invention.

FIG. 5 is a partial top view of a photo-mask according to the first embodiment of the invention. The photo-mask 500 includes m groups of patterns. Each pattern group includes n bars which are denoted as $(501)_1$, $(501)_2$, $(501)_3$, ..., $(501)_n$, and the width of the bars are $W_1, W_2, W_3, \ldots, W_n$ ($W_1 > W_2 > W_3 > \ldots > W_n$), respectively. The slits between the bars are $d_1, d_2, d_3, \ldots, d_n$ in width. M groups of patterns are arranged one by one.

Next, the steps of pattern transformation are performed through the photo-mask 500 of FIG. 5. It is assumed that n=4 in the following description.

Figure 6A:
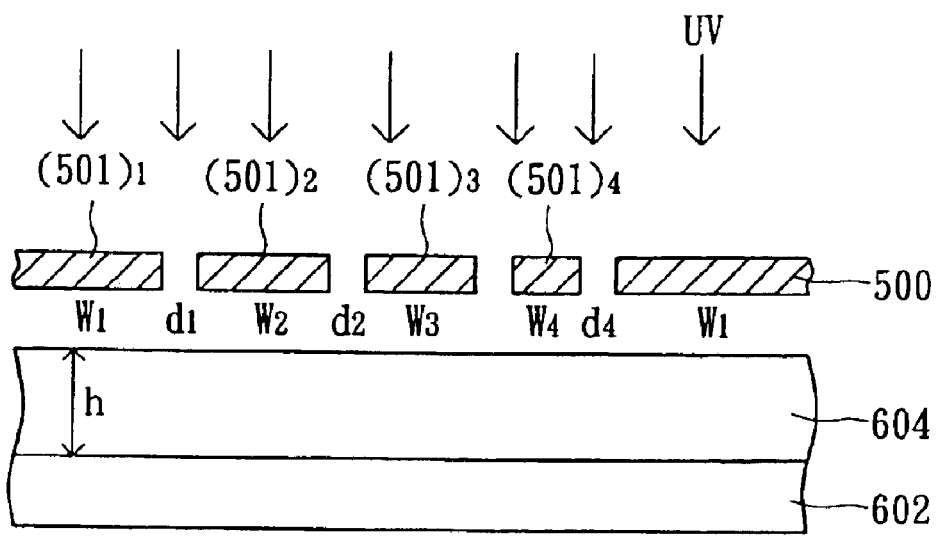
FIG. 6A~FIG. 6C is a method of fabricating slant reflector with bump structure according to the first embodiment of the invention.
Figure 6B:
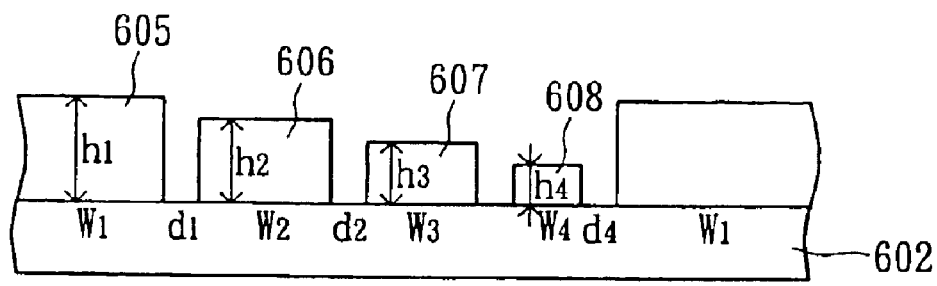
Figure 6C:
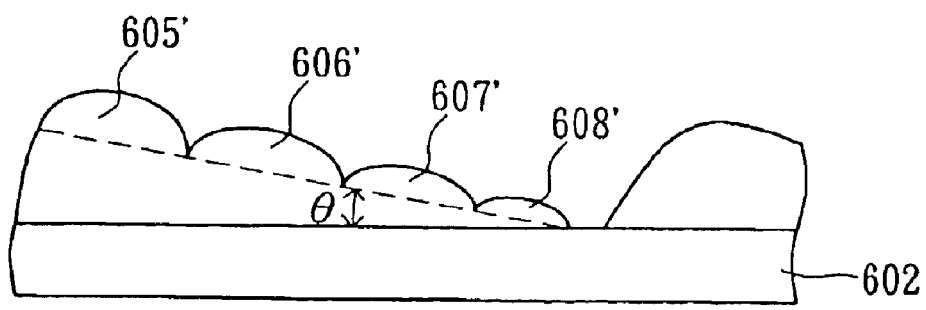

FIG. 6A~FIG. 6C show a method of fabricating a slant reflector with a bump structure according to the first embodiment of the invention. In FIG. 6A, the substrate 602 is coated with the photosensitive material, such as a positive type photo-resist 604, and then the photo-resist 604 undergoes the steps of UV (Ultraviolet) exposure and development. The portions of the photo-mask 500 marked by oblique lines represents the opaque regions. Since the portions of the photo-resist 604 shielded by the opaque bars $(501)_1$, $(501)_2$, $(501)_3$, $(501)_4$ are not exposed to UV radiation, these shielded portions are not dissolved in the developer. In contrast, the portions of the photo-resist 604 under the slits of the photo-mask 500 are exposed to UV radiation and are dissolved in the developer after photolithography. Thus, numerous strip-shaped photo-resist portions 605, 606, 607, 608, having different width and associated with the patterns of photo-mask 500, are formed as shown in FIG. 6B.

After exposing and developing, the photo-resist with the larger bottom area has a higher photo-resist block effect. For example, the photo-resist originally 14 μm wide is higher than 7 μm wide after exposing and developing. Accordingly, the widths of the strip-shaped photo-resist portions 605, 606, 607, 608 of FIG. 6B are $W_1 > W_2 > W_3 > W_4$, and the height thereof is $h_1 > h_2 > h_3 > h_4$, respectively. Also, the spaces between the photo-resist 605, 606, 607, 608 are $d_1, d_2, d_3, d_4$.

Next, the step of melting those strip-shaped photo-resist portions 605, 606, 607, 608 is performed by heat treatment.

The photo-resist is at least composed of resin, sensitizer with photoactivity, and appropriate solvent. Therefore, the solvent in the photo-resist is vaporized and decreased to a lower content if the heating treatment such as baking is applied to the photo-resist after developing. The advantage of decreasing the solvent content of the photo-resist is to enhance the adhesion of the photo-resist to the substrate. Subsequently, the heating temperature is increased up to the glass transition temperature (Tg) of the photo-resist, and the strip-shaped photo-resists 605, 606, 607, 608 (FIG. 6B) will be softened as a melting glass and then reflowed to create the smooth surface. By controlling the spaces $d_1$, $d_2$, $d_3$, $d_4$, the reflowed photo-resists are jointed to each other, and four contiguous photo-resist bumps 605', 606', 607', 608' (FIG. 6C) will be formed after performing the step of melting. Furthermore, since the strip-shaped photo-resist 605, 606, 607, 608 in FIG. 6B are arranged from high to low, the reflowed photo-resist 605', 606', 607', 608' form a slant profile with an inclined angle θ, as shown in FIG. 6C. In this preferred embodiment, a plurality of photo-resists are heated at the temperature ranging from 200° C. to 230° C. for 1 hours, approximately. However, the invention is not limited herein. In the practical application, the heating temperature and the duration time depend on the characteristic of the photo-resist.

Figure 7:
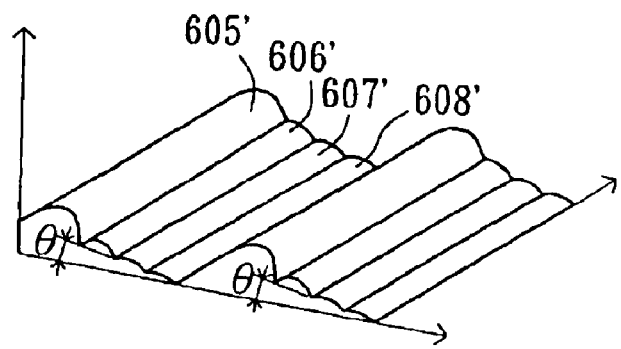
FIG. 7 is a perspective view of the slant reflector with bump structure according to the first embodiment of the invention.

FIG. 7 is a perspective view of the slant reflector with bump structure according to the first embodiment of the invention. It is assumed that the photo-mask 500 includes two groups of pattern (m=2). According to the fabricating method of FIG. 6A~FIG. 6C, two groups of bump structures with an inclined angle θ are produced, and each group of bump structures comprises four contiguous bumps (n=4) which the bumps are arranged from high to low, large to small, as shown in FIG. 7.

The slant reflector with the bump structure of the invention can be applied in the reflective type LCD. After the fabricating process of FIG. 6C, a metal film is further formed over the surface of photo-resist 605', 606', 607', and 608' of FIG. 7. Since the metal film has the same undulated profile as the bump structure underneath, the light entering the reflective type LCD can be reflected at various angles by the metal film. Therefore, the reflective type LCD possesses the attractive features, such as high brightness and wide viewing angle, in the commercial market.

According to the description above, the slant bump structure of the first embodiment comprises m groups of bump structures including a plurality of bumps (m×n), and each group of bump structure including n bumps, which n bumps are arranged from high to low, large to small in order to form a contiguous bump structure with an inclined angle.

Although each group of bump structure having n bumps is illustrated in this embodiment, the invention is not limited herein. Each group of bump structure can also include different number of bumps. For example, the first group may have 5 bumps, the second group may have 6 bumps, and the third group may have 4 bumps, etc.

Compared with the conventional process, the method of the invention (FIG. 6A~FIG. 6C) fabricates the slant reflector with bump structure by exposing to light and developing using one photo-mask so as to achieve the objective of the invention.

Second Embodiment

In the second embodiment, another photo-mask with several groups of patterns is provided for fabricating the slant reflector with bump structure of the invention. The photo-mask has m groups of patterns (m≧1, m is positive integral). Each pattern group includes a number of opaque bars, and the opaque bars are arranged from wide to narrow. For convenient description, each pattern group includes n bars (n≧2, with n being a positive integral). After fabrication, the bump aggregation on the photo-resist of this embodiment is further improved. Hence, the light scattering effect is better if the slant reflector with bump structure of this embodiment is applied in the reflective type LCD.

In the following description, it is assumed that 4 groups of patterns are randomly arranged and each group includes 3 bars (m=4, n=3), for the purpose of clear illustration.

Figure 8:
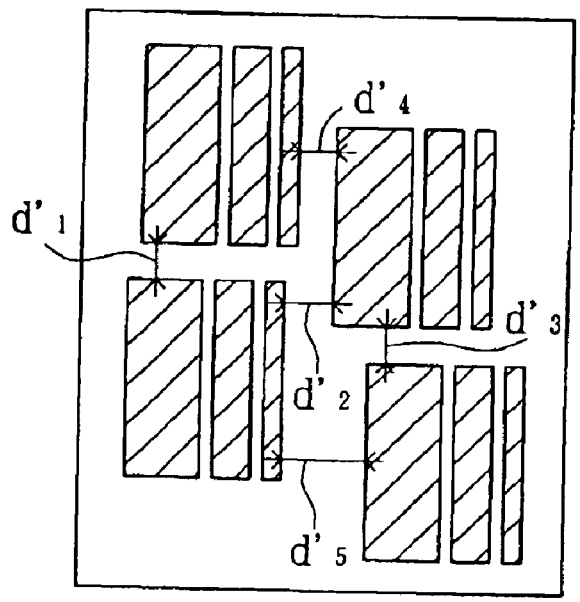
FIG. 8 is a partial top view of a photo-mask according to the second embodiment of the invention.

FIG. 8 is a partial top view of a photo-mask according to the second embodiment of the invention. There are 4 groups (m=4) of patterns arranged on the photo-mask 800, and each pattern group includes 3 bars (n=3) arranged from wide to narrow. Also, it is assumed that 4 groups are randomly arranged on the photo-mask 800.

Next, the steps of pattern transformation are performed through the photo-mask 800 of FIG. 8. The fabricating method of the second embodiment is similar to the first embodiment except the photo-mask 500 is replaced with the photo-mask 800. As shown in FIG. 6A~FIG. 6C, the photo-resist undergoes three steps of exposing, developing, and melting. Also, the photo-resist is a positive photo-resist dissolving in the developer, and the portions of the photo-mask (800) marked by oblique lines represents the opaque regions. In the second embodiment, not only the spaces between each opaque bar of a group, but also the distance between each group of pattern denoted as $d_1'$, $d_2'$, $d_3'$, $d_4'$, $d_5'$ in FIG. 8 can be controlled. After melting and reflowing, each group of photo-resist is able to joint together, and forms contiguous bump structure over the substrate.

Figure 9:
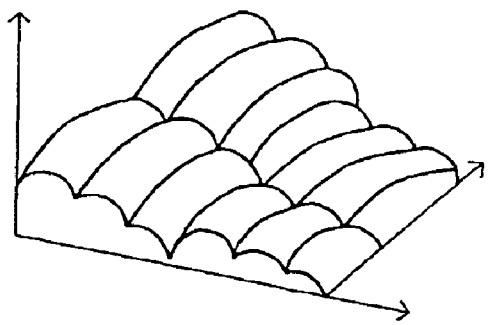
FIG. 9 is a perspective view of the slant reflector with bump structure according to the second embodiment of the invention.

FIG. 9 is a perspective view of the slant reflector with bump structure according to the second embodiment of the invention. In the similar fabricating steps, using photo-mask 800 can produce more bumps and create a rougher surface of the photo-resist than using photo-mask 500. Subsequently, a metal film (not shown) is further formed over the surface of photo-resist of FIG. 9. Since the reflective metal film has the same undulated profile as the bump structure underneath, the light entering the reflective type LCD can be reflected in various angles by the metal film. Thus, the reflective type LCD possesses the attractive features of high brightness and wide viewing angle in the commercial market.

Additionally, the bump structure similar to FIG. 9 can also be formed if m groups of patterns are arranged on the photo-mask orderly as an array. For example, m' and n' groups of pattern are respectively arranged in the length and width of the photo-mask (m=m'×n'). If the photo-mask has more groups of patterns, the produced slant reflector will have a higher aggregation of bump structure, and consequently the applied LCD has a better light scattering effect.

According to the aforementioned description, the invention utilizes one photo-mask with a particular pattern and a simple process comprising the steps of exposure, developing, and melting to form a slant reflector with numerous groups of bump structures having a great light scattering effect. For the reflective type LCD adopting the slant reflector with bump structures of the invention, the attractive features such as high brightness and wide viewing angle can be achieved. Also, m groups of pattern can be arranged on the photo-mask randomly, or in an array. Each group includes a plurality of opaque regions arranged from wide to narrow. The number of opaque regions in each group could be equal or unequal.

In the preferred embodiments described herein, the advantages of the slant reflector with bump structure and the method of fabricating the same according to the invention are summarized as follows:

1. The bump aggregation of slant reflector with bump structure of the invention is higher than that of conventional reflector, and has a better light scattering effect. Therefore, the reflective type LCD adopted the slant reflector with bump structures of the invention has the attractive features, such as high brightness and wide viewing angle.

2. One photo-mask and exposing procedure are required to fabricate the slant reflector with bump structure. The simplified process, saving the production cost and time, is very suitable for mass-production scale.

While the invention has been described by way of examples and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of fabricating a slant reflector with a bump structure, comprising:

providing one photomask;

providing a substrate;

forming a photosensitive material layer on the substrate;

patterning the photosensitive material layer, using the photomask, to form a plurality of bumps, each bump having, before any step of jointing the bumps, a different bottom area and a different height, wherein the larger the bottom area, the greater the height; and jointing the bumps to form a slant surface with a bump structure, wherein only the one photomask is used to fabricate the slant reflector with the bump structure.

2. The method according to claim 1, wherein the step of jointing the bumps comprises:

melting the bumps by baking; and reflowing the bumps to form the slant surface with the bump structure.

3. A method of fabricating a slant reflector with a bump structure, comprising:

providing one photomask;

providing a substrate;

forming a photosensitive material layer on the substrate;

patterning the photosensitive material layer, using the photomask, to form m groups of patterns (m≧1, m is a positive integral), and each group of pattern includes a plurality of bumps, each bump having, before any step of jointing the bumps, a different bottom area and a different height, wherein the larger the bottom area, the greater the height; and jointing the bumps to form a bump structure with a slant surface, wherein only the one photomask is used to fabricate the slant reflector with the bump structure.

4. The method according to claim 3, wherein the bumps are arranged orderly according to the bottom area from large to small, thereby m (m≧1, m is a positive integral) groups of bump structures are formed on the slant surface after jointing, and each group of bump structure includes a plurality of contiguous bumps arranged from high to low, and from large to small.

5. The method according to claim 3, wherein the photosensitive material layer is orderly patterned to form m groups of patterns.

6. The method according to claim 3, wherein the photosensitive material layer is randomly patterned to form m groups of patterns.

7. The method according to claim 3, wherein each group of pattern includes n bumps (n≧2, n is a positive integral) with different bottom areas.

8. The fabricating method according to claim 7, wherein m groups of bump structure are formed on the slant surface after jointing, and each group includes n contiguous bumps.

9. The fabricating method according to claim 3, wherein the step of patterning the photosensitive material layer includes exposing and developing the photosensitive material layer.

10. A method of fabricating a slant reflector with a bump structure, comprising:

providing one photomask;

providing a substrate;

forming a photosensitive material layer on the substrate;

patterning the photosensitive material layer, using the photomask, to form a plurality of bumps, each bump having, before any step of jointing the bumps, a different bottom area and a different height, wherein the larger the bottom area, the greater the height;

jointing the bumps to form a bump structure having a slant surface, wherein only the one photomask is used to fabricate the slant reflector with the bump structure; and forming a metal film on the substrate and covering the slant surface with the bump structure.

11. The method according to claim 10, wherein the step of patterning the photosensitive material layer includes exposing and developing the photosensitive material layer.

12. The method according to claim 10, wherein the bumps melt by baking for jointing the bumps.

13. The method according to claim 10, wherein the slant reflector with the bump structure is applied in a reflective liquid crystal display.

14. A method of fabricating a slant reflector with a bump structure, comprising:

providing a photomask having at least one pattern group formed thereon, the pattern group being comprised of at least three opaque bars, each bar of the pattern group having a width that is different than a width of the other bars of the pattern group, each bar being separated from an adjacent bar by a slit;

providing a substrate;

forming a photosensitive material layer on the substrate;

patterning the photosensitive material layer, using the photomask, to form a plurality of different sized bumps; and jointing the bumps to form a slant surface with a bump structure.

15. The method according to claim 14, wherein the bars are arranged so that a narrowest bar begins the pattern group, and a widest bar terminates the pattern group, with the bars being progressively arranged from the narrowest bar to the widest bar.

16. The method according to claim 14, wherein only one photomask is used in fabricating the slant reflector with the bump structure.

17. The method according to claim 14, wherein each bump has a different bottom area and a different height, and wherein the larger the bottom area, the greater the height.

* * * * *